US012697840B2

(12) United States Patent
Nusier et al.

(10) Patent No.: US 12,697,840 B2
(45) Date of Patent: Aug. 4, 2026

(54) WHEEL ASSEMBLY WITH OUTER HUB HAVING POLYGONAL SHAPE

(71) Applicant: Ford Global Technologies, LLC, Dearborn, MI (US)

(72) Inventors: Saied Nusier, Canton, MI (US); Jamel E. Belwafa, Ann Arbor, MI (US); Srinivasan Sundararajan, Ann Arbor, MI (US); Rahul Arora, Birmingham, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 518 days.

(21) Appl. No.: 18/301,468

(22) Filed: Apr. 17, 2023

(65) Prior Publication Data

US 2024/0343061 A1 Oct. 17, 2024

(51) Int. Cl.
*B60C 7/14* (2006.01)
*B60B 9/26* (2006.01)

(52) U.S. Cl.
CPC .............. *B60C 7/146* (2021.08); *B60B 9/26* (2013.01)

(58) Field of Classification Search
CPC .... B60B 9/26; B60B 9/10; B60B 9/04; B60C 7/146; B60C 7/107; B60C 7/14
See application file for complete search history.

(56) References Cited

U.S. PATENT DOCUMENTS 500,293 A * 6/1893 Persil ........................ B60C 7/14
152/256

1,368,074 A * 2/1921 Thomson .................. B60B 9/26
152/85
4,553,577 A * 11/1985 Gregg ....................... B60B 9/26
152/80
5,125,443 A * 6/1992 Schwartzman ........... B60B 9/26
152/84
6,615,885 B1 * 9/2003 Ohm ......................... B60B 9/26
152/17

(Continued)

FOREIGN PATENT DOCUMENTS

CN 201552970 U 8/2010
CN 203449838 U 2/2014
CN 209683336 U 11/2019

OTHER PUBLICATIONS

"Suspension: ROW M030 vs Feals coilovers." www.rennlist.com, Mar. 25, 2022, 47 pages.

*Primary Examiner* — Jason R Bellinger
(74) *Attorney, Agent, or Firm* — Frank A. MacKenzie; Brooks Kushman P.C.

(57) ABSTRACT

A wheel assembly includes a rim, an inner hub concentric with the rim, and an outer hub concentric with the rim and the inner hub. The outer hub is between the rim and the inner hub. The wheel assembly includes a first set of spokes spaced circumferentially about the inner hub between the inner hub and the outer hub. The first set of spokes are elongated radially from the inner hub and having a sinusoidal shape. The wheel assembly includes a second set of spokes spaced circumferentially about the outer hub between the outer hub and the rim. The second set of spokes are elongated radially from the outer hub and having a sinusoidal shape. The second set of spokes are aligned with the first set of spokes circumferentially about the outer hub.

20 Claims, 6 Drawing Sheets

(56)                    References Cited

U.S. PATENT DOCUMENTS

| | | | |
|---|---|---|---|
| 11,718,126 B2 * | 8/2023 | Tardiff | B60C 7/146 |
| | | | 152/12 |
| 11,993,109 B2 * | 5/2024 | Thompson | B29D 30/02 |
| 2009/0243371 A1 | 10/2009 | Karlsson | |
| 2010/0200131 A1 * | 8/2010 | Iwase | B60C 7/18 |
| | | | 152/209.1 |
| 2011/0126948 A1 * | 6/2011 | Boyer | B60B 9/04 |
| | | | 152/76 |
| 2017/0368869 A1 * | 12/2017 | Cron | B60C 7/143 |
| 2019/0016077 A1 * | 1/2019 | Wilson | B60B 9/10 |
| 2019/0375239 A1 * | 12/2019 | Thompson | B60C 7/146 |
| 2020/0276861 A1 * | 9/2020 | Thompson | B60B 9/26 |
| 2023/0219366 A1 * | 7/2023 | Rimai | B60C 7/18 |
| | | | 152/5 |
| 2024/0157725 A1 * | 5/2024 | Leblanc | B62D 55/14 |
| 2025/0214377 A1 * | 7/2025 | Sasaki | B60C 7/146 |

* cited by examiner

WHEEL ASSEMBLY WITH OUTER HUB HAVING POLYGONAL SHAPE

BACKGROUND

Three-wheeled vehicles are lightweight, affordable vehicles used in urban transportation. Three-wheeled vehicles can be designed to accommodate a single-occupant or multiple occupants. Three-wheeled vehicles may have features that control deformation of a body and/or frame of the vehicle and/or other external components of the vehicle in the event of certain vehicle impacts, e.g., certain frontal vehicle impacts.

DETAILED DESCRIPTION

Figure 1:
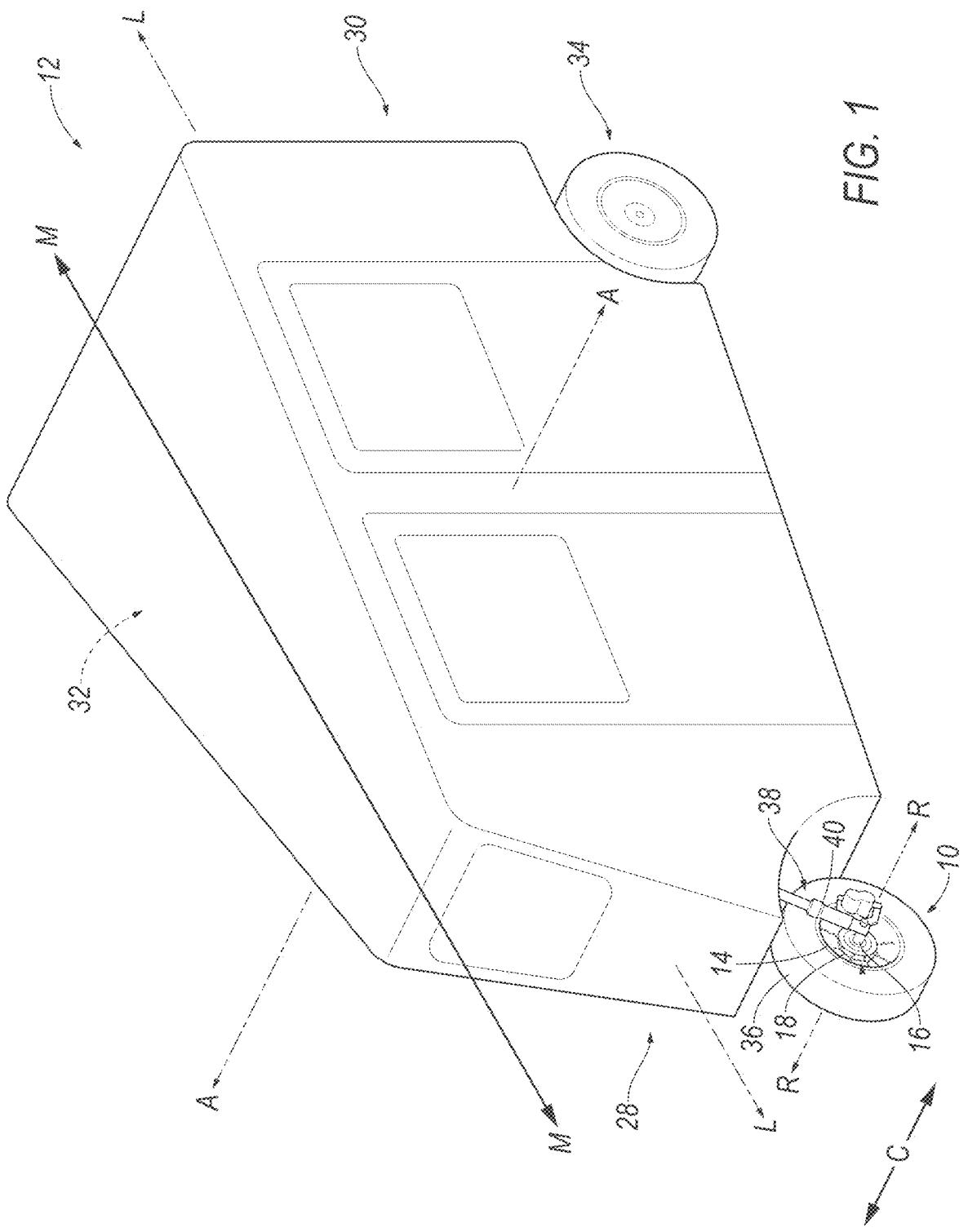
FIG. 1 is a perspective view of a three-wheeled vehicle.

A wheel assembly includes a rim, an inner hub concentric with the rim, and an outer hub concentric with the rim and the inner hub. The outer hub is between the rim and the inner hub. The wheel assembly includes a first set of spokes spaced circumferentially about the inner hub between the inner hub and the outer hub. The first set of spokes are elongated radially from the inner hub and having a sinusoidal shape. The wheel assembly includes a second set of spokes spaced circumferentially about the outer hub between the outer hub and the rim. The second set of spokes are elongated radially from the outer hub and having a sinusoidal shape. The second set of spokes are aligned with the first set of spokes circumferentially about the outer hub.

Each spoke of the first set of spokes may be fixed to the inner hub and the outer hub and each spoke of the second set of spokes may be fixed to the outer hub and the rim.

The outer hub may be spaced from the inner hub by the first set of spokes and the outer hub may be spaced from the rim by the second set of spokes.

The rim, the first set of spokes, the second set of spokes, and the outer hub may be rotatable about a rotational axis of the inner hub and the rim, the first set of spokes, the second set of spokes, and the outer hub may be deformable relative to the inner hub.

The outer hub may be polygonal with four vertices circumferentially spaced by 90 degrees and at each of the four vertices, the first set of spokes and the second set of spokes each may include one spoke aligned with each other circumferentially about the outer hub and elongated coaxially in a radial direction from the inner hub.

The outer hub and the spokes may be designed so that, when the rim deforms at a deformation area, the spoke of the second set of spokes nearest the deformation area may be compressed between the rim and the outer hub and the two spokes of the second set of spokes at the vertices spaced at 90 degrees are in tension between the rim and the outer hub.

The spoke of the first set of spokes nearest the deformation area may be compressed between the outer hub and the inner hub and the two spokes of the first set of spokes at the vertices spaced at 90 degrees from the deformation area are in tension between the outer hub and the inner hub.

The outer hub is octagonal with eight vertices and at each of the eight vertices, the first set of spokes and the second set of spokes each may include one spoke aligned with each other circumferentially about the outer hub and elongated coaxially in a radial direction from the inner hub.

The rim may define a vertical axis and a horizontal axis perpendicular to each other and perpendicular to a rotational axis of the inner hub. The rim, the first set of spokes, the second set of spokes, and the outer hub may be designed so that, when a force is applied to the rim along the horizontal axis the first set of spokes and the second set of spokes may be in compression when one of the spokes extends along the horizontal axis and when an angle between the spoke and the horizontal axis is less than an angle between the spoke and the vertical axis and the first set of spokes and the second set of spokes may be in tension when one of the spokes extends along the vertical axis and when an angle between the spoke and the vertical axis is less than an angle between the spoke and the horizontal axis.

The rim may be elongated along a vehicle-longitudinal axis, the rim being deformable along the vehicle-longitudinal axis.

Each spoke of the second set of spokes may meet one of the spokes of the first set of spokes, respectively, at the inner hub.

A vehicle includes a vehicle frame and a wheel supported by the vehicle frame. The wheel is rotatable relative to the vehicle frame. The wheel have a rim and the wheel having an inner hub concentric with the rim. The wheel having an outer hub concentric with the rim and the inner hub, the outer hub being between the rim and the inner hub. The wheel has a first set of spokes spaced circumferentially about the inner hub between the inner hub and the outer hub. The first set of spokes is elongated radially from the inner hub and having a sinusoidal shape. The wheel has a second set of spokes spaced circumferentially about the outer hub between the outer hub and the rim. The second set of spokes is elongated radially from the outer hub and having a sinusoidal shape. The second set of spokes is aligned with the first set of spokes circumferentially about the outer hub.

Each spoke of the first set of spokes may be fixed to the inner hub and the outer hub and each spoke of the second set of spokes is fixed to the outer hub and the rim.

The outer hub may be spaced from the inner hub by the first set of spokes and the outer hub may be spaced from the rim by the second set of spokes.

The vehicle frame may be elongated along a vehicle-longitudinal axis. The rim may be deformable along the vehicle-longitudinal axis relative to the vehicle frame.

The outer hub is polygonal with four vertices circumferentially spaced by 90 degrees and at each of the four vertices, the first set of spokes and the second set of spokes each include one spoke aligned with each other circumferentially about the outer hub and elongated coaxially in a radial direction from the inner hub.

The outer hub and the spokes may be designed so that, when the rim deforms at a deformation area. The spoke of the second set of spokes nearest the deformation area may be compressed between the rim and the outer hub and the two spokes of the second set of spokes at the vertices spaced at 90 degrees are in tension between the rim and the outer hub.

The spoke of the first set of spokes nearest the deformation area may be compressed between the outer hub and the inner hub and the two spokes of the first set of spokes at the vertices spaced at 90 degrees from the deformation area are in tension between the outer hub and the inner hub.

The outer hub may be octagonal with eight vertices and at each of the eight vertices, the first set of spokes and the second set of spokes each may include one spoke aligned with each other circumferentially about the outer hub and elongated coaxially in a radial direction from the inner hub.

The rim may define a vertical axis and a horizontal axis perpendicular to each other and perpendicular to a rotational axis of the inner hub. The rim, the first set of spokes, the second set of spokes, and the outer hub may be designed so that, when a force is applied to the rim along the horizontal axis, the first set of spokes and the second set of spokes are in compression when one of the spokes extends along the horizontal axis and when an angle between the spoke and the horizontal axis is less than an angle between the spoke and the vertical axis and the first set of spokes and the second set of spokes are in tension when one of the spokes extends along the vertical axis and when an angle between the spoke and the vertical axis is less than an angle between the spoke and the horizontal axis.

With reference to the Figures, wherein like numerals indicate like parts throughout the several views, a wheel assembly 10 for a vehicle 12, specifically a front wheel 10 of a three-wheeled vehicle 12, includes a rim 14, an inner hub 16 concentric with the rim 14, and an outer hub 18 concentric with the rim 14 and the inner hub 16. The outer hub 18 is between the rim 14 and the inner hub 16. The wheel assembly 10 includes a first set of spokes 20 spaced circumferentially about the inner hub 16 between the inner hub 16 and the outer hub 18. The first set of spokes 20 are elongated radially from the inner hub 16 and having a sinusoidal shape. The wheel assembly 10 includes a second set of spokes 22 spaced circumferentially about the outer hub 18 between the outer hub 18 and the rim 14. The second set of spokes 22 are elongated radially from the outer hub 18 and having a sinusoidal shape. The second set of spokes 22 are aligned with the first set of spokes 20 circumferentially about the outer hub 18.

The spokes 24 of the first set of spokes 20 and the spokes 26 of the second set of spokes 22 may manage deformation into the three-wheeled vehicle 12 during certain vehicle impacts, i.e., when a force above a predetermined level during certain vehicle impacts is applied to the wheel assembly 10. The sinusoidal shape of the spokes 24, 26 may collapse and expand in controlled directions to allow management of deformation into the three-wheeled vehicle 12 in the event of certain vehicle impacts.

With reference to FIG. 1, the three-wheeled vehicle 12 may be any suitable type of ground vehicle, e.g., a passenger or commercial automobile. For example, the three-wheeled vehicle 12 may be any suitable type of ground vehicle, e.g., a motorized tricycle, auto rickshaw, tuk, etc. As shown in the Figures, the three-wheeled vehicle 12 may be a motorcycle-based vehicle.

The three-wheeled vehicle 12 defines a vehicle-longitudinal axis L extending between a front vehicle end 28 and a rear vehicle end 30 of the three-wheeled vehicle 12. The three-wheeled vehicle 12 defines a cross-vehicle axis A extending cross-vehicle from one side to the other side of the three-wheeled vehicle 12. A cross-vehicle direction C is parallel to the cross-vehicle axis A. The three-wheeled vehicle 12 defines a vehicle vertical axis (not labeled). The vehicle-longitudinal axis L, the cross-vehicle axis A, and the vehicle-vertical axis are perpendicular relative to each other.

The three-wheeled vehicle 12 includes a vehicle frame 32 and a vehicle body (not numbered). The vehicle frame 32 may be of a unibody construction in which the vehicle frame 32 is unitary with the vehicle body including frame rails, pillars, roof rails, etc. As another example, the vehicle body and vehicle frame 32 may have a body-on-frame construction also referred to as a cab-on-frame construction in which the vehicle body and vehicle frame 32 are separate components, i.e., are modular, and the vehicle body is supported on and affixed to the frame. Alternatively, the vehicle frame 32 and vehicle body may have any suitable construction. The frame and vehicle body may be of any suitable material, for example, steel, aluminum, and/or fiber-reinforced plastic, etc.

The three-wheeled vehicle 12 may house one or more occupants. Specifically, the vehicle frame 32 defines an occupant compartment (not shown) to house one or more occupants of the three-wheeled vehicle 12. The occupant compartment may extend across the three-wheeled vehicle 12, i.e., from one side to the other side of the three-wheeled vehicle 12. The occupant compartment may extend from the front vehicle end 28 to the rear vehicle end 30 with the front vehicle end 28 being in front of the rear vehicle end 30 during forward motion of the vehicle. The three-wheeled vehicle 12 may accommodate one or more occupants. For example, as shown in the Figures, the three-wheeled vehicle 12 may accommodate more than one occupant, e.g., two or three occupants. In other examples not shown in the Figures, the three-wheeled vehicle 12 may accommodate a single occupant. In other words, the occupant compartment is sized and shaped to house only one occupant.

The three-wheeled vehicle 12 may define a midline M elongated along the vehicle-longitudinal axis L, i.e., vehicle fore-and-aft. The midline M of the vehicle frame 32 may be spaced equidistantly from each side of the three-wheeled vehicle 12. In other words, the midline M is in the middle of the vehicle frame 32. The vehicle frame 32 is elongated along the midline M and the vehicle-longitudinal axis L. Specifically, the vehicle frame 32 is elongated from the front vehicle end 28 to the rear vehicle end 30 along the midline M and the vehicle-longitudinal axis L.

With continued reference to FIG. 1, the three-wheeled vehicle 12 may include body panels (not numbered). The body panels may be supported by the vehicle frame 32. Specifically, the body panels may be fixed to the vehicle frame 32. The body panels may be fixed to the vehicle frame 32 in any suitable manner, e.g., fasteners, welding, etc. The three-wheeled vehicle 12 may include any suitable number of body panels supported by the vehicle frame 32 at any suitable location of the three-wheeled vehicle 12. For example, the three-wheeled vehicle 12 may include a body panel supported by each side of the three-wheeled vehicle 12, a vehicle floor (not numbered), a vehicle roof (not numbered), etc. The body panels may be made of any suitable material, e.g., steel, aluminum, composite, plastic, etc.

The vehicle roof and the vehicle floor are spaced from each other. Specifically, the vehicle floor is spaced downwardly from the vehicle roof. The vehicle roof defines the upper boundary of the occupant compartment and may extend from the front vehicle end 28 of the occupant compartment to the rear vehicle end 30 of the occupant compartment.

The vehicle floor defines the lower boundary of the occupant compartment and may extend from the front vehicle end 28 of the occupant compartment to the rear vehicle end 30 of the occupant compartment. The vehicle floor may include upholstery, for example, carpet, and may have a class-A surface facing the occupant compartment, i.e., a surface specifically manufactured to have a high quality, finished, aesthetic appearance free of blemishes.

The vehicle frame 32 may extend from the front vehicle end 28 to the rear vehicle end 30. The rear vehicle end 30 may be wider than the front vehicle end 28. Because the vehicle frame 32 is wider at the rear vehicle end 30 than at the front vehicle end 28, more occupants may be able to be housed at the rear vehicle end 30 of the vehicle frame 32 and occupant compartment.

The vehicle frame 32 may include any suitable number of members (not all shown) to define a shape of the vehicle. For example, as shown in the Figures, the vehicle frame 32 may include a first post (not shown) and a second post (not shown) spaced cross-vehicle from each other at the front vehicle end 28. The vehicle frame 32 may include a cross-member (not shown) extending from the first post to the second post.

As shown in the FIG. 2, the three-wheeled vehicle 12 includes one or more wheel assemblies 10, 34 (hereinafter referred to as a "front wheel 10" or a "rear wheel 34"). Specifically, the three-wheeled vehicle 12 includes a single front wheel 10 and two rear wheels 34. The front wheel 10 is disposed vehicle-forward of the front vehicle end 28 of the occupant compartment and the rear wheels 34 are disposed adjacent the rear vehicle end 30. In other words, the front wheel 10 is disposed at the front vehicle end 28 and the rear wheels 34 are disposed at the rear vehicle end 30. The front wheel 10 and rear wheels 34 are supported by the vehicle frame 32. Specifically, the front wheel 10 is supported by the vehicle frame 32 vehicle-forward of the front vehicle end 28 and the rear wheels 34 are supported by the vehicle frame 32 adjacent the rear vehicle end 30. The front wheel 10 is disposed at the midline M. In other words, the front wheel 10 is spaced equidistantly from each side of the three-wheeled vehicle 12 in the cross-vehicle direction C. The rear wheels 34 may be disposed on each side of the three-wheeled vehicle 12 at the rear vehicle end 30 of the three-wheeled vehicle 12. In other words, the rear wheels 34 are spaced cross-vehicle from each other. The three-wheeled vehicle 12 may include a rear wheel 34 on each side of the midline M of the vehicle.

The front wheel 10 and the two rear wheels 34 are rotatable relative to the vehicle frame 32. Each front wheel 10 includes the rim 14 having a diameter elongated along the vehicle-longitudinal axis L at the midline M, the inner hub 16 about which the wheels rotate that is concentric with the rim 14, the outer hub 18 concentric with the rim 14 and the inner hub 16, a plurality of spokes 24, 26 between the rim 14 and the inner hub 16, and a tire 36 fitted about the rim 14. The plurality of spokes 24, 26, specifically a first set of spokes 20 and a second set of spokes 22, are described further below. The front wheel 10 is rotatable about a rotational axis R of the inner hub 16. Specifically, the first set of spokes 20, the second set of spokes 22, the outer hub 18, the rim 14, and the tire 36 are rotatable about the rotational axis R of the inner hub 16. In other words, the first set of spokes 20, the second set of spokes 22, the outer hub 18, the rim 14, and the tire 36 are rotatable about an axle (not shown) supported by the vehicle frame 32 that extends through the inner hub 16. The axle is supported by the vehicle frame 32 in any suitable way, e.g., fasteners, welding, etc. As described further below, the axle is coupled to a steering system 38 to allow the front wheel 10 to be steered by an occupant.

The three-wheeled vehicle 12 may include any suitable number of subsystems coupled to one or more of the front wheel 10 and rear wheels 34. For example, the three-wheeled vehicle 12 may include a suspension system that absorbs and dampens shocks and vibrations from the wheels, a braking system that decelerates the three-wheeled vehicle 12, a powertrain to drive the front wheel 10 or the rear wheels 34, the steering system 38 as described further below, and/or any other suitable subsystems.

Figure 2:
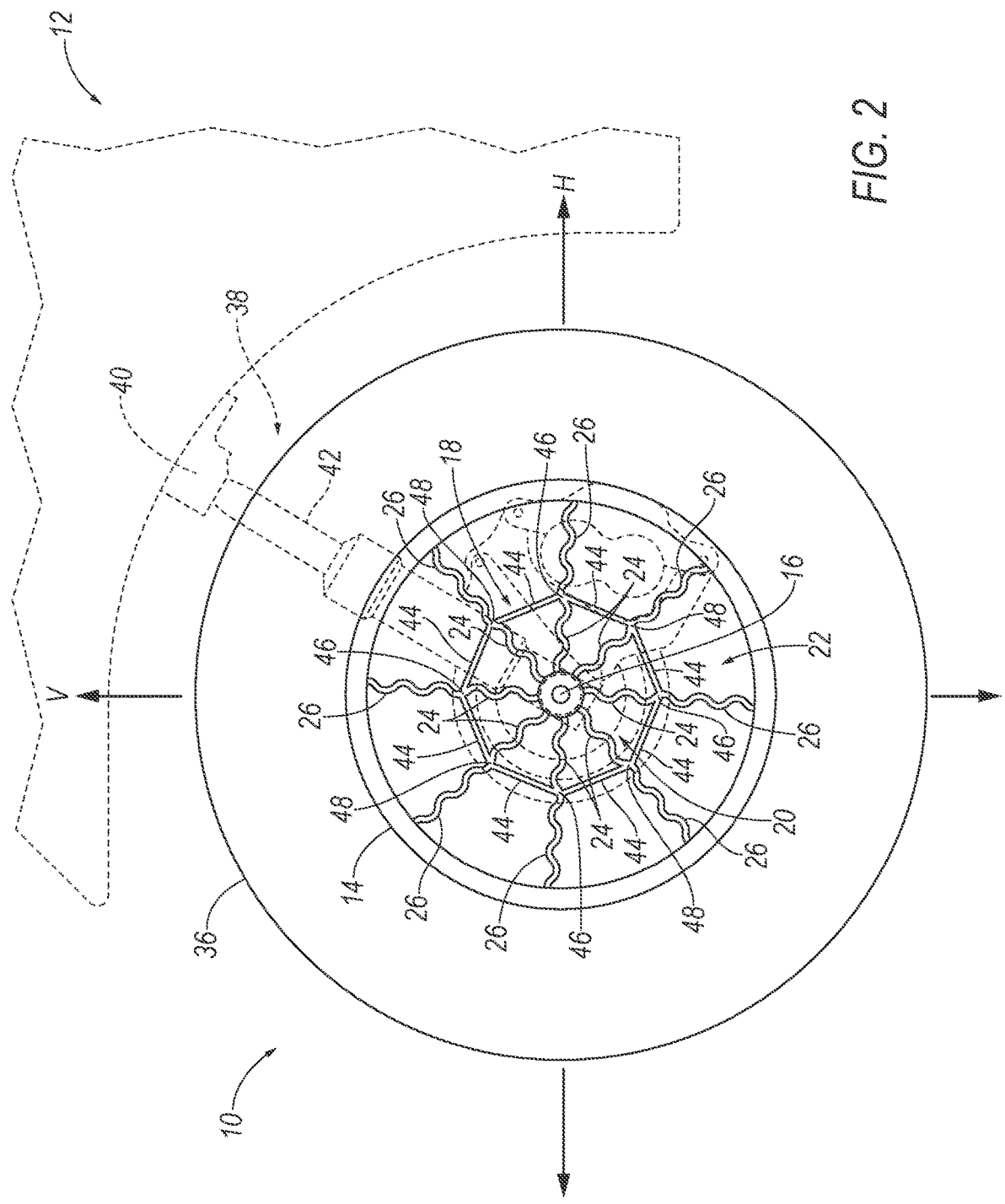
FIG. 2 is a side view of a front wheel of the three-wheeled vehicle.

With continued reference to FIG. 2, the three-wheeled vehicle 12 includes the steering system 38 positioned at the front vehicle end 28. The steering system 38 is coupled to the front wheel 10 to allow an occupant to steer the three-wheeled vehicle 12 as the three-wheeled vehicle 12 is in motion. The steering system 38 is rotatably supported by the vehicle frame 32 to steer the three-wheeled vehicle 12. The steering system 38 is elongated upwardly from the hub and the axle of the front wheel 10 to a steering device (not shown) inside the occupant compartment, e.g., handle-bars, a steering wheel, etc. In other words, the steering system 38 is elongated upwardly from the hub and the axle and into the occupant compartment to allow the occupant to have access to the steering device inside the occupant compartment. The steering system 38 is aligned with the midline M of the three-wheeled vehicle 12. In other words, the steering system 38 may be positioned between the first post and the second post of the vehicle frame 32.

The steering system 38 includes the steering post (not shown), a crossbar 40, and a pair of beams 42. The steering device is supported by the steering post. Specifically, the steering device extends downwardly from the steering device to the crossbar 40. The steering post may be elongated along an axis (not shown). The steering post may be aligned with the midline M of the three-wheeled vehicle 12. In other words, the steering post may be between the first post and the second post.

The steering post is rotatably supported by the vehicle frame 32. In other words, the steering post is rotatable relative to the vehicle frame 32. Specifically, the steering post is rotatable about the axis elongated along the steering post. When an occupant turns the three-wheeled vehicle 12, the occupant turns the steering device in the desired direction, e.g., clockwise or counterclockwise, and the steering post rotates about the axis in the desired direction. Turning the steering device turns the steering post to allow the three-wheeled vehicle 12 to turn right or left during forward and rearward motion of the three-wheeled vehicle 12.

The steering post is connected to the front wheel 10 such that when an occupant turns the steering device, the steering post rotates to turn the front wheel 10 in the desired direction of the occupant. As in the example shown in the Figures, the steering post is indirectly connected to the front wheel 10. In other words, other components, for example the crossbar 40 and beams 42 as described below, may be between the steering post and the front wheel 10 such that when the steering post rotates about the axis, the front wheel 10 rotates in the desired direction of the occupant.

The crossbar 40 is supported by the steering post. In other words, the crossbar 40 is connected to the steering post. Specifically, the crossbar 40 is fixed to the steering post. As an occupant is turning the three-wheeled vehicle 12, the occupant may rotate the steering device which rotates the steering post about the axis. As the steering post rotates about the axis, the crossbar 40 rotates about the axis. In other words, both the steering post and the crossbar 40 rotate about the axis as a unit.

The steering system 38 includes a pair of beams 42. Each of the beams 42 of the steering system 38 extend downwardly from the crossbar 40. In other words, the beams 42 are elongated from the crossbar 40 toward the front wheel 10. Specifically, one of the beams 42 is elongated downwardly from the crossbar 40 with the steering post being between the beams 42.

The beams 42 are coupled to the front wheel 10. In other words, the beams 42 extend from the crossbar 40 to the front wheel 10. Specifically, the beams 42 extend from the crossbar 40 to the hub and axle of the front wheel 10. One of the beams 42 is on one side of the front wheel 10 and the other beam 42 is on the other side of the front wheel 10. In other words, the front wheel 10 is between the beams 42. Each of the beams 42 is coupled to the axle of the front wheel 10. In other words, the beams 42 are on both sides of the front wheel 10 and connected to the axle on each side of the front wheel 10. The beams 42 may be included in or connected to the braking system and/or the suspension system of the front wheel 10.

Figures 3A, 3B:
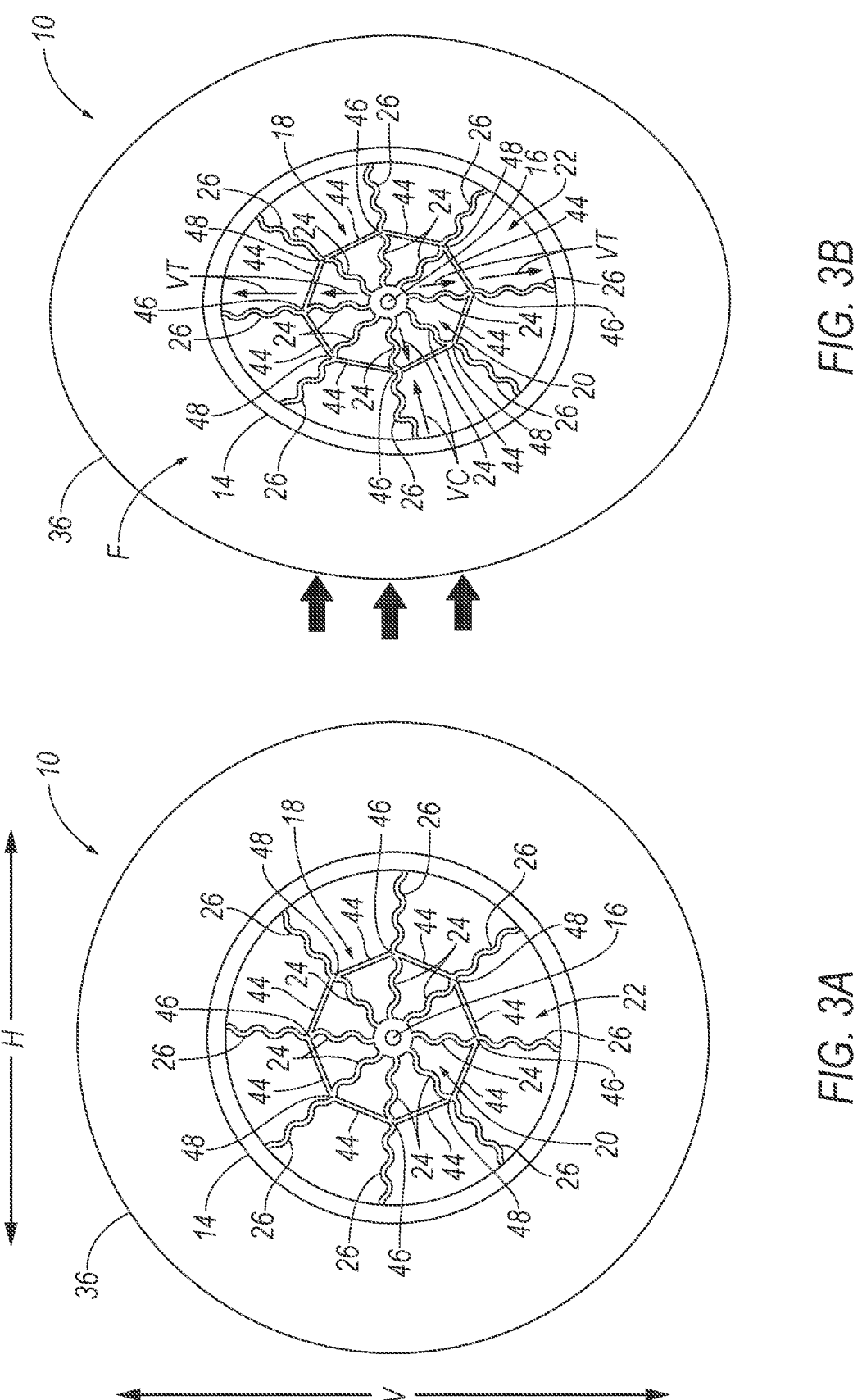
FIGS. 3A-3E is a side view representation of a progression of deformation of the spokes of the front wheel in the event of certain vehicle impacts.
Figures 3C, 3D, 3E:
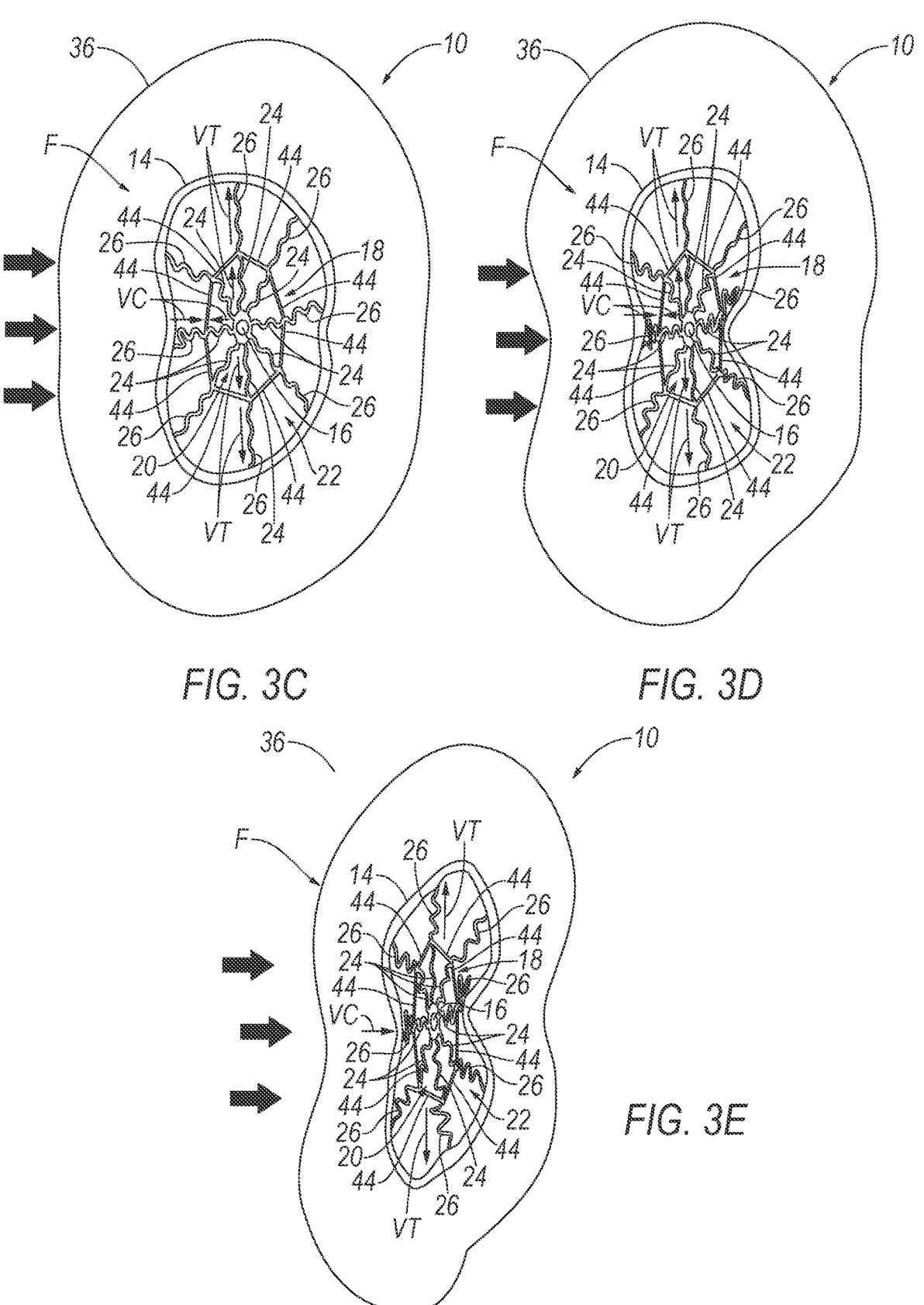

With reference to FIGS. 2-3E, the rim 14 of the front wheel 10 has a circular shape defining a wheel vertical axis V and a wheel horizontal axis H perpendicular to each other. The wheel horizontal axis H may be parallel to the vehicle-longitudinal axis L and the wheel vertical axis V may be parallel with the vehicle vertical axis. The wheel horizontal axis H and the wheel vertical axis V are each perpendicular to the rotational axis R of the inner hub 16.

The inner hub 16, the outer hub 18, and the rim 14 are all concentric with each other. In other words, the inner hub 16, the outer hub 18, and the rim 14 are all centered on the same point, i.e., the axle. The outer hub 18 and the rim 14 are spaced radially from the inner hub 16. The outer hub 18 is spaced from both the rim 14 and the inner hub 16. Specifically, the outer hub 18 is between the inner hub 16 and the rim 14 and the outer hub 18 is spaced from both the rim and the inner hub 16.

The outer hub 18 of the front wheel 10 is of a non-circular shape. In other words, the outer hub 18 may not be round. The outer hub 18 may be polygonal. Specifically, the outer hub 18 is polygonal with four or more sides 44. The outer hub 18 is regularly polygonal. In other words, each of the sides 44 of the outer hub 18 are of equal length. The four or more sides 44 are connected to each other about the inner hub 16. Specifically, the four or more sides 44 are connected to each other at four or more vertices 46, 48. The vertices 46, 48 may be spaced circumferentially about the inner hub 16.

The outer hub 18 may include primary vertices 46 spaced circumferentially by 90 degrees about the inner hub 16. In other words, 90 degrees may be between the primary vertices 46 about the inner hub 16. As shown in FIG. 2, the outer hub 18 includes four primary vertices 46 spaced circumferentially by 90 degrees about the inner hub 16. In the orientation of the front wheel 10 shown in FIGS. 2-3E, the outer hub 18 may include two primary vertices 46 on the wheel vertical axis V of the front wheel 10 and spaced from each other along the wheel vertical axis V. Further, as shown in the orientation of the front wheel 10 shown in FIGS. 2-3E, the outer hub 18 may include two primary vertices 46 on the wheel horizontal axis H of the front wheel 10 and spaced from each other along the wheel horizontal axis H. One primary vertex 46 is spaced upwardly from the inner hub 16, one primary vertex 46 is spaced downwardly from the inner hub 16, one primary vertex 46 is spaced to the right of the inner hub 16, and one primary vertex 46 is spaced to the left of the inner hub 16. Each of the primary vertices 46 are spaced 90 degrees from each of the adjacent primary vertices 46.

In the examples shown in FIGS. 2-3E, the outer hub 18 may include secondary vertices 48 between the primary vertices 46. In examples where the outer hub 18 is polygonal with more than four sides 44, the outer hub 18 includes secondary vertices 48 between the primary vertices 46. In the example shown in the Figures, the outer hub 18 include four secondary vertices 48. Each of the secondary vertices 48 is between two primary vertices 46. The secondary vertices 48 are spaced from each other by 90 degrees from each of the adjacent secondary vertices 48. The secondary vertices 48 are spaced equidistantly from the primary vertices 46. In other words, the secondary vertices 48 are spaced from each of the primary vertices 46 by 45 degrees.

The vertices 46, 48 are spaced around the outer hub 18 from each other by the sides 44. In the example shown in the Figures, the outer hub 18 is octagonal. In other words, in the example shown in the Figures, the outer hub 18 includes eight sides 44 and eight vertices 46, 48. Specifically, the outer hub 18 includes the four primary vertices 46 spaced 90 degrees from each other and four secondary vertices 48 spaced 90 degrees from each other.

The front wheel 10 includes a plurality of spokes 24, 26 between the inner hub 16 and the rim 14. Specifically, the front wheel 10 includes the first set of spokes 20 between the inner hub 16 and the outer hub 18 and the second set of spokes 22 between the outer hub 18 and the rim 14. The spokes 24 of the first set of spokes 20 are spaced circumferentially about the inner hub 16 and the spokes 26 of the second set of spokes 22 are spaced circumferentially about the outer hub 18. In other words, each sets of spokes 20, 22 includes a plurality of spokes 24, 26 that are spaced from each other around the inner hub 16 and around the outer hub 18.

As discussed above, the spokes 24 of the first set of spokes 20 are spaced circumferentially about the inner hub 16. In other words, the spokes 24 of the first set of spokes 20 are spaced from each other around a perimeter of the inner hub 16. The spokes 24 of the first set of spokes 20 are between the inner hub 16 and the outer hub 18. Specifically, the spokes 24 of the first set of spokes 20 extend from the inner hub 16 to the outer hub 18. In other words, the outer hub 18 is spaced from the inner hub 16 by the spokes 24 of the first set of spokes 20. Each spoke 24 of the first set of spokes 20 is connected to the inner hub 16 and the outer hub 18. Specifically, the spokes 24 of the first set of spokes 20 are fixed to the inner hub 16 and the outer hub 18. The spokes 24 of the first set of spokes 20 may be fixed to the inner hub 16 and the outer hub 18 in any suitable way, e.g., welding, molding, etc. The spokes 24 of the first set of spokes 20 are each elongated radially from the inner hub 16 to the outer hub 18. In other words, the spokes 24 of the first set of spokes 20 are elongated along at least a portion of a radius of the rim 14 from the inner hub 16 to the outer hub 18. Specifically, the spokes 24 of the first set of spokes 20 are elongated along the portion of the radius that extends between the inner hub 16 and the outer hub 18.

With continued reference to FIGS. 2-3E, the spokes 26 of the second set of spokes 22 are spaced circumferentially about the outer hub 18. In other words, the spokes 26 of the second set of spokes 22 are spaced from each other around a perimeter of the outer hub 18. The spokes 26 of the second set of spokes 22 are between the outer hub 18 and the rim 14. Specifically, the spokes 26 of the second set of spokes 22 extend from the outer hub 18 to the rim 14. In other words, the outer hub 18 is spaced from the rim 14 by the spokes 26 of the second set of spokes 22. Each spoke 26 of the second set of spokes 22 is connected to the outer hub 18 and the rim 14. Specifically, the spokes 26 of the second set of spokes 22 is fixed to the outer hub 18 and the rim 14. The spokes 26 of the second set of spokes 22 may be fixed to the outer hub 18 and the rim 14 in any suitable way, e.g., welding, molding, etc. The spokes 26 of the second set of spokes 22 are each elongated radially from the outer hub 18 to the rim 14. In other words, the spokes 26 of the second set of spokes 22 are elongated along at least a portion of the radius of the rim 14 from the outer hub 18 to the rim 14. Specifically, the spokes 26 of the second set of spokes 22 are elongated along the portion of the radius that extends between the outer hub 18 and the rim 14.

Each spoke 24 of the first set of spokes 20 is aligned with each spoke 26 of the second set of spokes 22. Specifically, each spoke 24 of the first set of spokes 20 is aligned with each spoke 26 of the second set of spokes 22 at the outer hub 18. The spokes 24, 26 may each be aligned at the vertices 46, 48 of outer hub 18. In the example shown in the Figures, at each of the four primary vertices 46, the first set of spokes 20 and the second set of spokes 22 each include one spoke 24, 26 aligned with each other circumferentially about the outer hub 18 and elongated coaxially in a radial direction from the inner hub 16. At each of the four secondary vertices 48, the first set of spokes 20 and the second set of spokes 22 each include one spoke 24, 26 aligned with each other circumferentially about the outer hub 18 and elongated coaxially in the radial direction from the inner hub 16. In other words, at each of the eight vertices 46, 48 of the outer hub 18 shown in the Figures, the first set of spokes 20 and the second set of spokes 22 each include one spoke 24, 26 aligned with each other circumferentially about the outer hub 18 and elongated coaxially in the radial direction from the inner hub 16. Specifically, each of the spokes 24 of the first set of spokes 20 is elongated from the inner hub 16 to the outer hub 18 along a common radial direction as the spokes 26 of the second set of spokes 22 are elongated from the outer hub 18 to the rim 14. In other words, each of the spokes 24 of the first set of spokes 20 is elongated along the same radius as the spokes 26 of the second set of spokes 22.

Each spoke 24 of the first set of spokes 20 meets a spoke 26 of the second set of spokes 22 at the outer hub 18. Specifically, each spoke 24 of the first set of spokes 20 may meet a spoke 26 of the second set of spokes 22 at one of the vertices 46, 48 of the outer hub 18. Each spoke 24 of the first set of spokes 20 is paired with a spoke 26 of the second set of spokes 22 at each of the vertices 46, 48 of the outer hub 18. Each of the vertices 46, 48, both the primary vertices 46 and the secondary vertices 48, may be between the first set of spokes 20 and the second set of spokes 22 along each pair of spokes.

The pairs of spokes 24, 26 may be unitary with each other. In other words, pairs of spokes 24, 26 may be endless from the rim 14 to the inner hub 16 and each of the pairs of spokes 24, 26 may be a continuous one-piece unit from the rim 14 to the inner hub 16. The pairs of spokes 24, 26 may each appear to be a single spoke 24 extending from the rim 14 to the inner hub 16.

The front wheel 10 may include any suitable number of spokes 24, 26. For example, as shown in the Figures, the first set of spokes 20 includes eight spokes 24 spaced circumferentially and the second set of spokes 22 includes eight spokes 26 spaced circumferentially. Specifically, the front wheel 10 includes eight pairs of spokes 24, 26 spaced circumferentially about the inner hub 16.

The spokes 24 of the first set of spokes 20 and the spokes 26 of the second set of spokes 22 have a sinusoidal shape. In other words, the spokes 24 of the first set of spokes 20 and the spokes 26 of the second set of spokes 22 have a shape of a sine curve, or, said another way, a sine wave. Said another way, the spokes 24 of the first set of spokes 20 and the spokes 26 of the second set of spokes 22 has a shape of alternating curved peaks and curved valleys along an entire length of the spokes 24, 26. The sine curve of the spokes 24 of the first set of spokes 20 and spokes 26 of the second set of spokes 22 are elongated along the radii of the rim 14. In other words, the since curve of each pair of spokes 24, 26, i.e., the alignment of the first set of spokes 20 with the second set of spokes 22, is elongated along the radii of the rim 14. Each pair of spokes 24, 26 has a consistent sine curve from the inner hub 16 to the outer hub 18 along each radius of the rim 14. The sine curve of the spokes 24, 26 may have an amplitude that is consistent from the inner hub 16 to the outer hub 18. The amplitude, as described above, is the height of the curved peaks and curved valleys of the sine curve relative to the radius along which the pair of spokes 24, 26 is elongated.

The rim 14, the spokes 24 of the first set of spokes 20, the spokes 26 of the second set of spokes 22, and the outer hub 18 deform in the event of certain impacts to the three-wheeled vehicle 12 to manage deformation into the three-wheeled vehicle 12. The rim 14, the spokes 24 of the first set of spokes 20, the spokes 26 of the second set of spokes 22, and the outer hub 18 may manage deformation into the three-wheeled vehicle 12 during certain vehicle impacts, i.e., when a force above a predetermined level during certain vehicle impacts is applied to the front wheel 10. During certain vehicle impacts, specifically, certain frontal vehicle impacts, the rim 14 deforms at a deformation area F. The deformation area F, as shown in the Figures, may be at a vehicle-forward end of the rim 14. When certain vehicle impacts occur, deforming at the deformation area F occurs when a force from the certain vehicle impact exceeds a predetermined level. As the rim 14 rotates about the axle, the orientation of the spokes 24, 26 relative to the deformation area F may be different because the spokes 24, 26 may be located at a different radial positions about the axle at any given time during the rotation. The spokes 24, 26 may deform differently depending on the radial location of the spokes 24, 26 relative to the deformation area F. An example orientation of the spokes 24, 26, such as is shown in FIGS. 2-3E, is described further below. FIGS. 3A-3E show a side view representation of the progression of deformation of the front wheel 10.

When the rim 14 deforms at the deformation area F, e.g., when a force is applied to the rim 14 along the wheel horizontal axis H, from certain vehicle impacts, the outer hub 18 and the spokes 24, 26 are designed such that the first set of spokes 20 and the second set of spokes 22 are in compression when one of the spokes 24, 26 from the first set of spokes 20 and the second set of spokes 22 extends along the wheel horizontal axis H. Specifically, the spoke 24 of the first set of spokes 20 nearest the deformation area F is compressed between the outer hub 18 and the inner hub 16 and the spoke 26 of the second set of spokes 22 nearest the deformation area F is compressed between the rim 14 and the outer hub 18. In other words, a compression force, as indicated by the force vectors VC shown in FIG. 3B, exists along the spoke 24 of the first set of spokes 20 between the inner hub 16 and outer hub 18 and the spoke 26 of the second set of spokes 22 between the rim 14 and the outer hub 18.

The first set of spokes 20 and the second set of spokes 22 are in compression when an angle between the spoke 24, 26 and the wheel horizontal axis H is less than an angle between the spoke 24, 26 and the wheel vertical axis V. In other words, compression forces along the spokes 24, 26 may exist at other radial locations from the wheel horizontal axis H. For example, between zero and 45 degrees from the wheel horizontal axis H, the spokes 24, 26 may be in compression between the rim 14 and the outer hub 18 and between the outer hub 18 and the inner hub 16.

As the rim 14 deforms at the deformation area F, in the spokes 24, 26 that are in compression, the sinusoidal shape of the spokes 24, 26 collapses along the spoke 24, 26. In other words, a length of the spokes 24, 26 shortens along the spoke 24, 26. The curved peaks and curved valleys collapse on themselves to shorten the length of the spokes 24, 26 along the radius of the rim 14. The collapsing of the spokes 24, 26 from the compression force provides management of deformation into the three-wheeled vehicle 12.

When the rim 14 deforms at the deformation area F, e.g., when a force is applied to the rim 14 along the wheel horizontal axis H, the outer hub 18 and the spokes 24, 26 are designed such that the first set of spokes 20 and the second set of spokes 22 are in tension when two of the spokes 24 from the first set of spokes 20 and two of the spokes 26 from the second set of spokes 22 extends along the wheel vertical axis V. Specifically, the outer hub 18 and the spokes 24, 26 are designed such that the spokes 24, 26 spaced at 90 degrees from the deformation area F in tension. In other words, the two spokes 24 of the first set of spokes 20 at the primary vertices 46 spaced at 90 degrees from the deformation area F are in tension between the outer hub 18 and the inner hub 16 and the two spokes 26 of the second set of spokes 22 at the primary vertices 46 spaced at 90 degrees from the deformation area F are in tension between the rim 14 and the outer hub 18. A tension force, as indicated by forces vectors VT shown in FIG. 3B, exists along the spokes 24 of the first set of spokes 20 between the inner hub 16 and the outer hub 18 and the spokes 26 of the second set of spokes 22 between the rim 14 and the outer hub 18.

The first set of spokes 20 and the second set of spokes 22 are in tension when an angle between the spoke 24, 26 and the wheel vertical axis V is less than an angle between the spoke and the wheel horizontal axis H. In other words, tension forces along the spokes 24, 26 may exist at other radial locations from the wheel vertical axis V. For example, between zero and 45 degrees from the wheel vertical axis V, the spokes 24, 26 may be in tension between the rim 14 and the outer hub 18 and between the outer hub 18 and the inner hub 16.

Figure 4A:
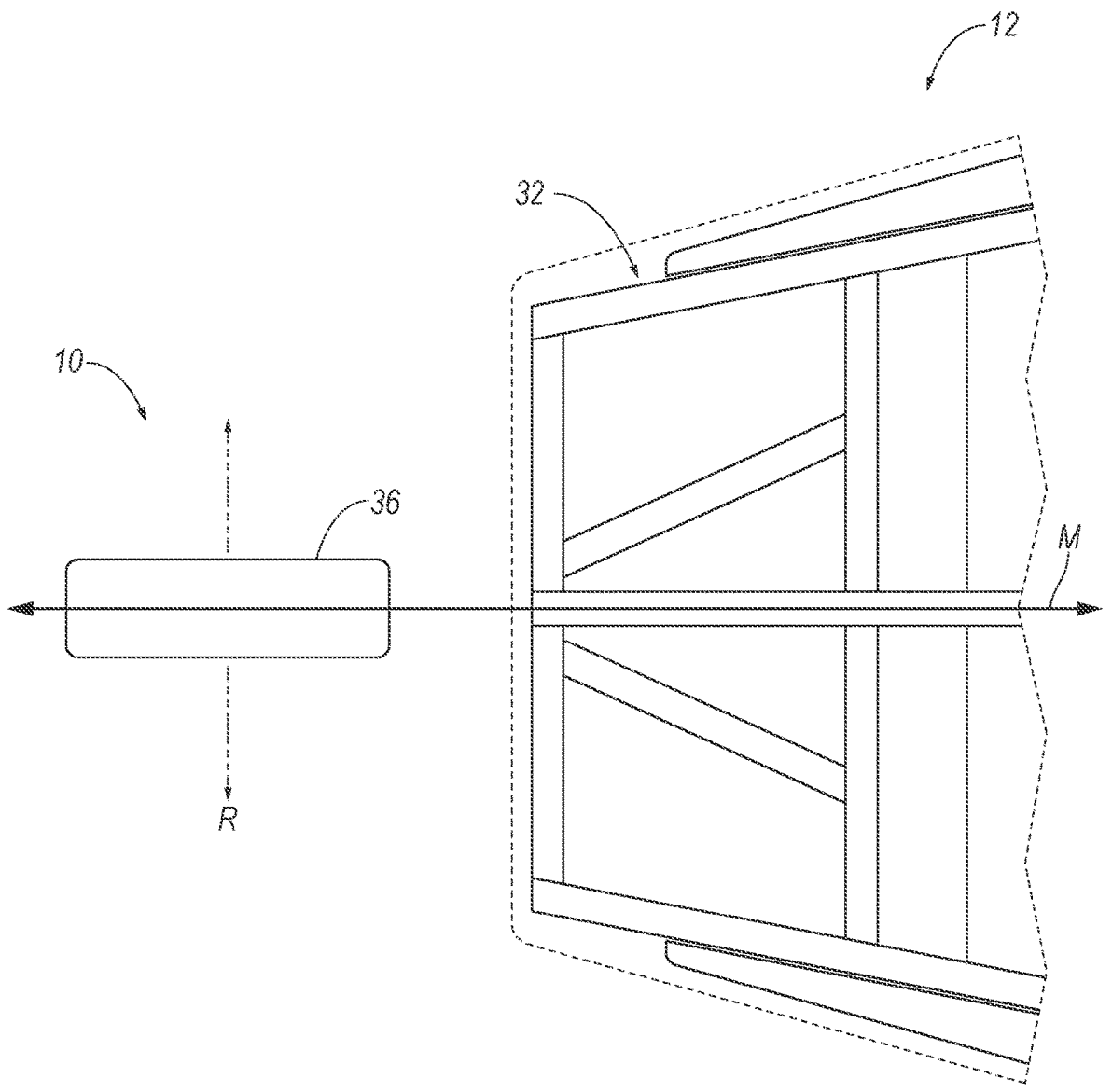
FIG. 4A is a bottom plane view of the front wheel and a vehicle frame of the three-wheeled vehicle prior to deformation from certain vehicle impacts.
Figure 4B:
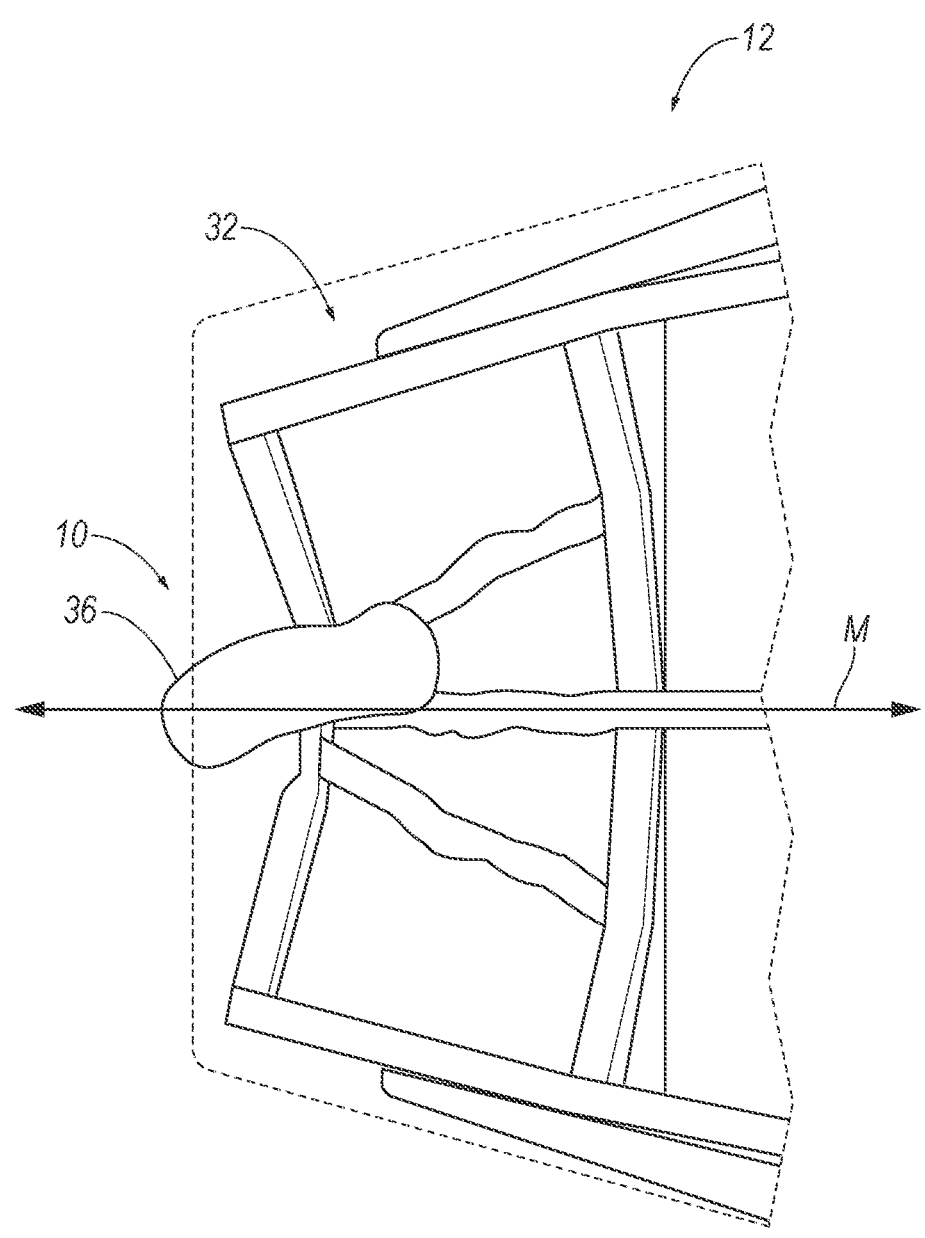
FIG. 4B is a bottom plane view of a representation of the front wheel and the vehicle frame of the three-wheeled vehicle after deformation from certain vehicle impacts.

As the rim 14 deforms at the deformation area F, in the spokes 24, 26 that are in tension, the sinusoidal shape of the spokes 24, 26 extends along the spoke 24, 26. In other words, the length of the spokes 24, 26 lengthens along the spoke 24, 26. The curved peaks and the curved valleys extend to lengthen along the radius of the rim 14. The extension of the spokes 24, 26 from the tension forces provides management of deformation into the three-wheeled vehicle 12. FIGS. 4A and 4B show the three-wheeled vehicle 12 prior to deformation and a representation of the three-wheeled vehicle 12 after deformation. The compression and tension forces provide management of deformation into the three-wheeled vehicle 12.

The disclosure has been described in an illustrative manner, and it is to be understood that the terminology which has been used is intended to be in the nature of words of description rather than of limitation. The numerical adverbs "first" and "second" used herein are used merely as identifiers and do not signify order or importance. Many modifications and variations of the present disclosure are possible in light of the above teachings, and the disclosure may be practiced otherwise than as specifically described.

What is claimed is:

1. A wheel assembly comprising:
a rim;
an inner hub concentric with the rim;
an outer hub concentric with the rim and the inner hub, the outer hub being between the rim and the inner hub;
a first set of spokes between the inner hub and the outer hub, the spokes of the first set of spokes being elongated radially from the inner hub and having a sinusoidal shape;
a second set of spokes between the outer hub and the rim, the spokes of the second set of spokes being spaced from each other circumferentially about the outer hub and elongated from the outer hub to the rim and having a sinusoidal shape; and
the outer hub having a polygonal shape having sides and vertices;
at each vertex, a spoke of the first set of spokes being aligned circumferentially about the outer hub with a spoke of the second set of spokes.

2. The wheel assembly of claim 1, wherein each spoke of the first set of spokes is fixed to the inner hub and the outer hub and each spoke of the second set of spokes is fixed to the outer hub and the rim.

3. The wheel assembly of claim 1, wherein the outer hub is spaced from the inner hub by the first set of spokes and the outer hub is spaced from the rim by the second set of spokes.

4. The wheel assembly of claim 1, wherein:
the rim, the first set of spokes, the second set of spokes, and the outer hub are rotatable about a rotational axis of the inner hub; and
the rim, the first set of spokes, the second set of spokes, and the outer hub are deformable relative to the inner hub.

5. The wheel assembly of claim 1, wherein the outer hub has four vertices circumferentially spaced by 90 degrees.

6. The wheel assembly of claim 5, wherein the outer hub and the spokes of the first set of spokes and the second set of spokes are designed so that, when the rim deforms at a deformation area, the spoke of the second set of spokes nearest the deformation area is compressed between the rim and the outer hub and the two spokes of the second set of spokes at the vertices spaced at 90 degrees from the deformation area are in tension between the rim and the outer hub.

7. The wheel assembly of claim 6, wherein the spoke of the first set of spokes nearest the deformation area is compressed between the outer hub and the inner hub and the two spokes of the first set of spokes at the vertices spaced at 90 degrees from the deformation area are in tension between the outer hub and the inner hub.

8. The wheel assembly of claim 1, wherein the outer hub is octagonal with eight vertices.

9. The wheel assembly of claim 8, wherein:
the rim defines a vertical axis and a horizontal axis perpendicular to each other and perpendicular to a rotational axis of the inner hub; and
the rim, the first set of spokes, the second set of spokes, and the outer hub are designed so that, when a force is applied to the rim along the horizontal axis:

the first set of spokes and the second set of spokes are in compression when one of the spokes extends along the horizontal axis and when an angle between the spoke and the horizontal axis is less than an angle between the spoke and the vertical axis; and the first set of spokes and the second set of spokes are in tension when one of the spokes extends along the vertical axis and when an angle between the spoke and the vertical axis is less than an angle between the spoke and the horizontal axis.

10. The wheel assembly of claim 1, wherein each spoke of the second set of spokes meets one of the spokes of the first set of spokes, respectively, at the outer hub.

11. A vehicle comprising:

a vehicle frame; and a wheel supported by the vehicle frame, the wheel being rotatable relative to the vehicle frame;

the wheel having a rim;

the wheel having an inner hub concentric with the rim;

the wheel having an outer hub concentric with the rim and the inner hub, the outer hub being between the rim and the inner hub;

the wheel having a first set of spokes between the inner hub and the outer hub, the spokes of the first set of spokes being elongated radially from the inner hub and having a sinusoidal shape;

the wheel having a second set of spokes between the outer hub and the rim, the spokes of the second set of spokes being spaced from each other circumferentially about the outer hub and elongated from the outer hub to the rim and having a sinusoidal shape;

the outer hub having a polygonal shape having sides and vertices; and at each vertex, a spoke of the first set of spokes being aligned circumferentially about the outer hub with a spoke of the second set of spokes.

12. The vehicle of claim 11, wherein each spoke of the first set of spokes is fixed to the inner hub and the outer hub and each spoke of the second set of spokes is fixed to the outer hub and the rim.

13. The vehicle of claim 11, wherein the outer hub is spaced from the inner hub by the first set of spokes and the outer hub is spaced from the rim by the second set of spokes.

14. The vehicle of claim 11, wherein the outer hub has four vertices circumferentially spaced by 90 degrees.

15. The vehicle of claim 14, wherein the outer hub and the spokes of the first set of spokes and the second set of spokes are designed so that, when the rim deforms at a deformation area, the spoke of the second set of spokes nearest the deformation area is compressed between the rim and the outer hub and the two spokes of the second set of spokes at the vertices spaced at 90 degrees from the deformation area are in tension between the rim and the outer hub.

16. The vehicle of claim 15, wherein the spoke of the first set of spokes nearest the deformation area is compressed between the outer hub and the inner hub and the two spokes of the first set of spokes at the vertices spaced at 90 degrees from the deformation area are in tension between the outer hub and the inner hub.

17. The vehicle of claim 11, wherein the outer hub is octagonal with eight vertices.

18. The vehicle of claim 17, wherein:

the rim defines a vertical axis and a horizontal axis perpendicular to each other and perpendicular to a rotational axis of the inner hub; and the rim, the first set of spokes, the second set of spokes, and the outer hub are designed so that, when a force is applied to the rim along the horizontal axis:

the first set of spokes and the second set of spokes are in compression when one of the spokes extends along the horizontal axis and when an angle between the spoke and the horizontal axis is less than an angle between the spoke and the vertical axis; and the first set of spokes and the second set of spokes are in tension when one of the spokes extends along the vertical axis and when an angle between the spoke and the vertical axis is less than an angle between the spoke and the horizontal axis.

19. The vehicle of claim 1, wherein the polygonal shape of the outer hub is a regular polygon.

20. The vehicle of claim 11, wherein the polygonal shape of the outer hub is a regular polygon.

* * * * *